United States Patent
Kim et al.

(10) Patent No.: US 12,181,755 B2
(45) Date of Patent: Dec. 31, 2024

(54) OPTICAL STACK, AND MANUFACTURING METHOD FOR SAME, AND SMART WINDOW INCLUDING SAME

(71) Applicant: DONGWOO FINE-CHEM CO., LTD., Iksan-si (KR)

(72) Inventors: Hyung-Hun Kim, Iksan-si (KR); Jin-Ho Kim, Iksan-si (KR); Hyun-Sun Ryu, Iksan-si (KR); Sub Heo, Iksan-si (KR)

(73) Assignee: DONGWOO FINE-CHEM CO., LTD., Iksan-si (KR)

( * ) Notice: Subject to any disclaimer, the term of this patent is extended or adjusted under 35 U.S.C. 154(b) by 0 days.

(21) Appl. No.: 18/639,933

(22) Filed: Apr. 18, 2024

(65) Prior Publication Data
US 2024/0353718 A1 Oct. 24, 2024

(30) Foreign Application Priority Data
Apr. 21, 2023 (KR) .................... 10-2023-0052516

(51) Int. Cl.
*G02F 1/1343* (2006.01)
*G02F 1/1335* (2006.01)
*G02F 1/1337* (2006.01)

(52) U.S. Cl.
CPC .... *G02F 1/13439* (2013.01); *G02F 1/133528* (2013.01); *G02F 1/133784* (2013.01)

(58) Field of Classification Search
None
See application file for complete search history.

(56) References Cited

U.S. PATENT DOCUMENTS
2016/0291357 A1* 10/2016 Min .................. G02B 5/3016

FOREIGN PATENT DOCUMENTS
JP 2018-10035 A 1/2018

* cited by examiner

*Primary Examiner* — Phu Vu
(74) *Attorney, Agent, or Firm* — NSIP Law (57) ABSTRACT

A variable transmittance optical stack and a manufacturing method for the same, and a smart window including the same are proposed, and the variable transmittance optical stack includes a first polarizing plate, a first electrode layer formed on one surface of the first polarizing plate, a second polarizing plate opposing the first polarizing plate, a second electrode layer formed on one surface of the second polarizing plate, and opposing the first electrode layer, and a liquid crystal layer provided between the first electrode layer and the second electrode layer, wherein the first electrode layer and the second electrode layer includes conductive polymers, and the first electrode layer and the second electrode layer have physical alignment structures on at least a part of regions thereof by a rubbing manner.

18 Claims, 3 Drawing Sheets

OPTICAL STACK, AND MANUFACTURING METHOD FOR SAME, AND SMART WINDOW INCLUDING SAME

CROSS REFERENCE TO RELATED APPLICATION

The present application claims priority to Korean Patent Application No. 10-2023-0052516, filed Apr. 21, 2023, the entire contents of which are incorporated herein for all purposes by this reference.

BACKGROUND OF THE INVENTION

Field of the Invention

The present disclosure relates to an optical stack and a manufacturing method for the same, and a smart window including the same.

Description of the Related Art

In general, there are many cases in which an external light blocking coating is applied to a window of a means of transportation such as a vehicle. However, the transmittance of a conventional window of a means of transportation is fixed, and the transmittance of the external light blocking coating is also fixed. Therefore, the entire transmittance of the conventional window of the means of transportation is fixed, thereby causing an accident. For example, when the entire transmittance is preset low, there is no problem during day when ambient light is abundant. However, there is a problem in that it is difficult for a driver or the like to properly check the surroundings of the means of transportation at night when ambient light is insufficient. Alternatively, when the entire transmittance is preset high, there is a problem of causing glare to a driver or the like during day when ambient light is sufficient. Accordingly, a variable transmittance optical stack capable of changing transmissive properties of light when a voltage is applied has been developed.

The variable transmittance optical stack is driven by changing the transmittance by controlling liquid crystals according to application of voltage. The variable transmittance optical stack developed so far conventionally includes an alignment film to provide orientation of liquid crystal compounds for adjusting of optical transmittance.

For example, Japanese Patent Publication Application No. 2018-010035 discloses a light control film including an alignment film to provide orientation of liquid crystal compounds provided in a liquid crystal layer.

However, when the alignment film is included to provide orientation to the liquid crystal compounds as described above, in addition to a problem of thickness unevenness or deteriorated adhesion between substrates due to a drying condition of the alignment film, there is a problem of damages to a substrate in a process in which a plasma processing is performed on the substrate to applying the alignment film.

Therefore, there is a need to develop a variable transmittance optical stack to prevent thickness unevenness, exterior quality deterioration, or the like that occur when including the alignment film.

Documents of Related Art (Patent Document 1) Japan Patent Application Publication No. 2018-010035

SUMMARY OF THE INVENTION

The present disclosure is intended to minimize product defects due to thickness unevenness or deteriorated adhesion occurring when including an alignment film for providing orientation of liquid crystal compounds.

However, the problem to be solved by the present disclosure is not limited to the problems mentioned above, and other problems not mentioned will be clearly understood by those skilled in the art from the description below.

The present disclosure relates to a variable transmittance optical stack including: a first polarizing plate; a first electrode layer formed on one surface of the first polarizing plate; a second polarizing plate opposing the first polarizing plate; a second electrode layer formed on one surface of the second polarizing plate, and opposing the first electrode layer; and a liquid crystal layer provided between the first electrode layer and the second electrode layer, wherein the first electrode layer and the second electrode layer may include conductive polymers, and the first electrode layer and the second electrode layer may have physical alignment structures on at least a part of regions thereof by a rubbing manner.

In a first aspect of the present disclosure, the variable transmittance optical stack may be provided without a separate alignment film.

In a second aspect of the present disclosure, the first electrode layer and the second electrode layer may have a thickness ranging from 100 nm to 3,000 nm.

In a third aspect of the present disclosure, the first electrode layer and the second electrode layer may have sheet resistance of 200Ω/□ or less.

In a fourth aspect of the present disclosure, the first electrode layer and the second electrode layer may be made of compositions for formation of an electrode layer, and the compositions may include: conductive polymers; and one or more types selected from a group consisting of organic binders, organic solvents, silane coupling agents, and surfactants.

In a fifth aspect of the present disclosure, the conductive polymers may include one or more types selected from a group consisting of polythiophene, poly(3,4-ethylenedioxythiophene), polyaniline, polyacetylene, polydiacetylene, polyphenylene, polyphenylenevinylene, polyphenylenesulfide, polythienylenevinylene, polythiophenevinylene, polyfluorene, polypyrrole, poly(3,4-ethylenedioxythiophene):polystyrenesulfonate, poly(3,4-ethylenedioxythiophene):camphorsulfonic acid, poly(3,4-ethylenedioxythiophene):toluenesulfonic acid, poly(3,4-ethylenedioxythiophene):dodecylbenzenesulfonic acid, polyaniline:polystyrenesulfonate, polyaniline:camphorsulfonic acid, polypyrrole:polystyrenesulfonate, polypyrrole:camphorsulfonic acid, polypyrrole:toluenesulfonic acid, polypyrrole:dodecylbenzenesulfonic acid, polythiophene:polystyrenesulfonate, polythiophene:camphorsulfonic acid, polythiophene:toluenesulfonic acid, and polythiophene:dodecylbenzenesulfonic acid.

In a sixth aspect of the present disclosure, at least one electrode layer from among the first electrode layer and the second electrode layer may be formed to come into direct contact with one first polarizing plate from among the first polarizing plate and the second polarizing plate.

In a seventh aspect of the present disclosure, the variable transmittance optical stack may include: at least one transparent conductive layer from among a first transparent conductive layer arranged between the first polarizing plate and the first electrode layer; and a second transparent conductive layer arranged between the second polarizing plate and the second electrode layer.

In an eighth aspect of the present disclosure, at least one transparent conductive layer from among the first transparent conductive layer and the second transparent conductive layer may have a thickness ranging from 100 nm to 1,000 nm.

In a ninth aspect of the present disclosure, at least one transparent conductive layer from among the first transparent conductive layer and the second transparent conductive layer may include one or more types selected from a group consisting of transparent conductive oxide, metal, carbonaceous materials, conductive ink, and nanowires.

In a tenth aspect of the present disclosure, at least one polarizing plate from among the first polarizing plate and the second polarizing plate may include one or more types of functional layers selected from a group consisting of a protective layer, a retardation matching layer, and a refractive index-matching layer.

In an eleventh aspect of the present disclosure, at least one polarizing plate from among the first polarizing plate and the second polarizing plate may have a thickness ranging from 30 to 200 μm.

In a twelfth aspect of the present disclosure, the liquid crystal layer may include a ball spacer.

In a thirteenth aspect of the present disclosure, the ball spacer may have a diameter ranging from 1 to 10 μm.

In a fourteenth aspect of the present disclosure, an occupancy area of the ball spacer in the liquid crystal layer may range from 0.01% to 10% of an area of the liquid crystal layer.

In a fifteenth aspect of the present disclosure, the variable transmittance optical stack may include one or more types selected from a group consisting of an overcoat layer, a pressure sensitive adhesive/adhesive layer, an UV absorption layer, and a hard coating layer.

Furthermore, the present disclosure relates to a manufacturing method for the variable transmittance optical stack.

Furthermore, the present disclosure relates to a smart window including the variable transmittance optical stack.

Furthermore, the present disclosure relates to a means of transportation including the smart window.

Furthermore, the present disclosure relates to a vehicle including the smart window applied to at least one from among a front window, a rear window, a side window, a sunroof window, and an inner partition thereof.

Furthermore, the present disclosure relates to wearable device or a window and door for a building including the smart window.

According to the present disclosure, as an alignment film is not included in the optical stack, the optical stack of the present disclosure has the advantage in that product defects due to thickness unevenness, deteriorated adhesion, or the like according to a drying condition of an alignment film does not occur.

DETAILED DESCRIPTION OF THE DISCLOSURE

The present disclosure relates to a variable transmittance optical stack without an alignment film to provide orientation to liquid crystal compounds, thereby preventing a technical problem occurring when including an alignment film, for example, product defects due to thickness unevenness or deteriorated adhesion according to a drying condition of the alignment film.

More specifically, the present disclosure relates to a variable transmittance optical stack including: a first polarizing plate; a first electrode layer formed on one surface of the first polarizing plate; a second polarizing plate opposing the first polarizing plate; a second electrode layer formed on one surface of the second polarizing plate, and opposing the first electrode layer; and a liquid crystal layer provided between the first electrode layer and the second electrode layer, wherein the first electrode layer and the second electrode layer include conductive polymers, and the first electrode layer and the second electrode layer have a physical alignment structure on at least a part of regions by a rubbing manner.

Therefore, the variable transmittance optical stack of the present disclosure is particularly suitable for technical fields where transmissive properties of light can be changed in response to application of voltage and, for example, may be used for a smart window.

The smart window means an optical structure controlling the amount of light or heat passing through a window by changing transmissive properties of light according to application of an electrical signal. In other words, the smart window is provided to be changed into a transparent, opaque or translucent state by voltage, and is called variable transmittance glass, lighting control glass, or smart glass.

The smart window may be used as partitions for partitioning an internal space of vehicles and buildings or for protecting privacy, or as skylights arranged in openings of buildings, and may be used as highway signs, noticeboards, scoreboards, clocks or advertising screens, and may be used to replace glass of a means of transportation, such as windows or sunroof windows of cars, buses, aircrafts, ships, or trains.

The variable transmittance optical stack of the present disclosure may also be used for the smart window of the various technical fields mentioned above, but since the conductive layer is directly formed in the polarizing plate, there is no need to include a separate or additional substrate for forming the conductive layer and the thickness thereof is thin and is advantageous in the flexuosity, so the optical stack of the present disclosure may be used to be particularly suitable for a smart window of a vehicle or a building. According to one or multiple embodiments, the smart window to which the variable transmittance optical stack of the present disclosure is applied may be used for front windows, rear windows, side windows, and sunroof windows of a vehicle, or windows for a building, and the smart window may be used to not only an external light blocking use, but also an internal space partitioning use or a privacy protecting use such as an inner partition for a vehicle or a building.

Hereinbelow, embodiments of the present disclosure will be described in detail with reference to drawings. However, the following drawings accompanying this specification illustrate preferred embodiments of the present disclosure, and serve to further understand the technical idea of the present disclosure with the contents of the above-described invention. Therefore, the present disclosure should not be construed as being limited to matters described in the drawings.

Terms used in this specification are selected to describe embodiments and thus do not limit the present disclosure. In this specification, an element expressed in a singular form may be plural elements unless it is necessarily singular in the context. For example, "the polarizing plate" used in the specification may mean at least one polarizing plate of the first polarizing plate and the second polarizing plate, "the electrode layer" may mean one at least one electrode layer of the first electrode layer and the second electrode layer, and "the transparent conductive layer" may mean at least one transparent conductive layer of the first transparent conductive layer and the second transparent conductive layer.

As used herein, terms "comprise" and/or "comprising" do not mean exclusion of the presence or absence of one or more components, steps, movements and/or elements other than a component, a step, movement, and/or an element mentioned above. The same reference numerals are used throughout the specification to designate the same or similar elements.

Spatially relative terms "below", "lower surface", "lower portion", "above", "upper surface", "upper portion" may be used to easily describe the correlation between "one element or components" and "another element or other components", as shown in drawings. The spatially relative terms should be understood as terms including different directions of an element when being used or operated in addition to a direction shown in the drawings. For example, when an element shown in the drawings is turned over, the element described as being "below" or "lower" concerning another element may be placed "on" the another element. Accordingly, the exemplary term "below" may include both downward and upward directions. An element may be aligned in a different direction, and accordingly, the spatially relative terms may be interpreted according to alignment.

As used herein, "planar direction" may be interpreted as a thickness direction of a polarizing plate and/or an electrode layer, in other words, a direction viewed from the user's view side.

As used herein, "substantially" may be interpreted to include not only being physically completely identical, but also within an error range of measurement or manufacturing process, for example, may be interpreted as having an error range of 1% or less.

Figure 1:
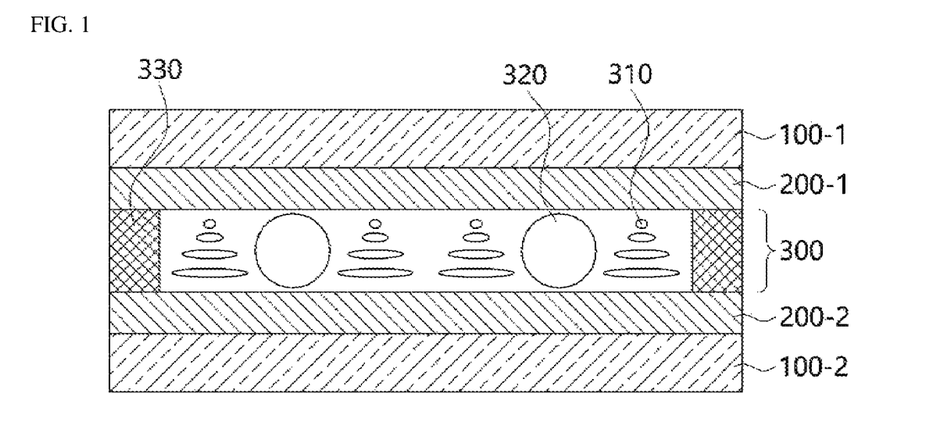
FIGS. 1 to 3 are views showing a stack structure of the variable transmittance optical stack according to one or multiple embodiments of the present disclosure.
Figure 2:
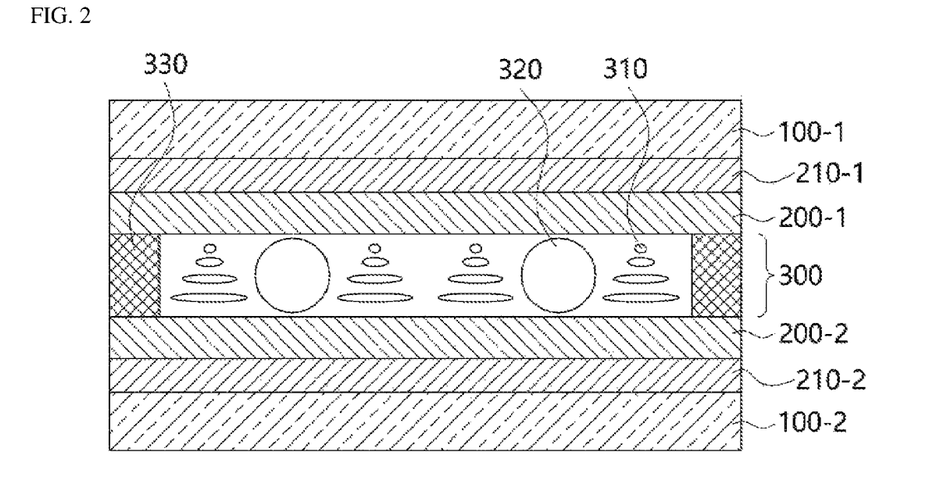
Figure 3:
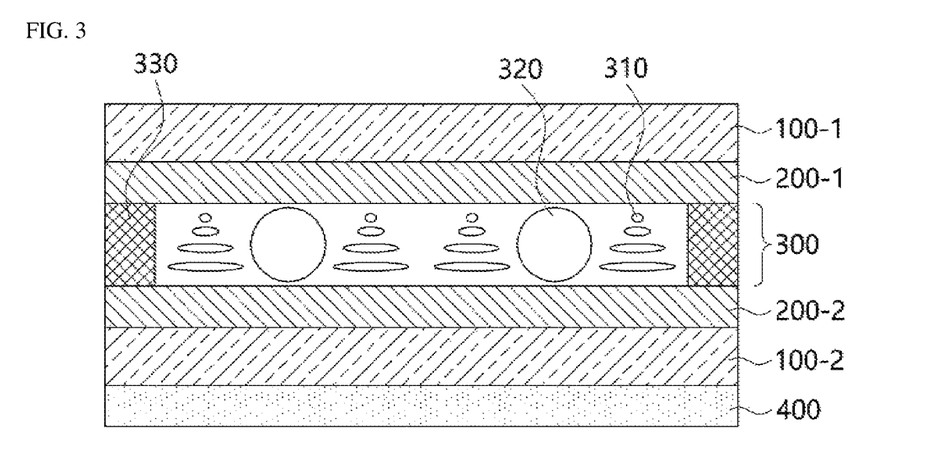

FIGS. 1 to 3 are views showing a stack structure of the variable transmittance optical stack according to one or multiple embodiments of the present disclosure. FIGS. 4A to 4E are views showing the stack structures of the polarizing plate according to one or multiple embodiments of the present disclosure.

Referring to FIGS. 1 to 3, according to the embodiment of the present disclosure, the variable transmittance optical stack may include a first polarizing plate 100-1, a second polarizing plate 100-2, a first electrode layer 200-1, a second electrode layer 200-2, and a liquid crystal layer 300, and if necessary, may include a transparent conductive layer 210 and/or a pressure sensitive adhesive layer 400.

Referring to FIGS. 4A to 4E, the polarizing plate 100 includes a polarizer 110, and may include functional layers such as a protective layer 120, a retardation matching layer 130, and a refractive index-matching layer 140, on one surface or both surfaces of the polarizer 110. For example, the polarizing plate 100 may include the polarizer 110, and the protective layer 120 stacked on one surface or both surfaces of the polarizer 110 (referring to FIGS. 4A and 4B). Furthermore, the polarizing plate 100 may include the polarizer 110, the protective layer 120 stacked on a first surface of the polarizer 110, and the retardation matching layer 130 stacked on a second surface opposing the first surface of the polarizer 110 (referring to FIG. 4C). Furthermore, the polarizing plate 100 may include the polarizer 110, the protective layer 120 stacked on the first surface of the polarizer 110, and the retardation matching layer 130 and the refractive index-matching layer 140 successively stacked on the second surface opposing the first surface of the polarizer 110 (referring to FIG. 4D). Alternatively, the polarizing plate 100 may include the polarizer 110, the protective layer 120 stacked on the first surface of the polarizer 110, and the protective layer 120 and the retardation matching layer 130 successively stacked on the second surface opposing the first surface thereof (referring to FIG. 4E).

The polarizer 110 may be a polarizer currently developed or to be developed, for example, may be a stretched polarizer or a coated polarizer.

According to the embodiment, the stretched polarizer may include a stretched polyvinyl alcoholic (PVA) based resin. The PVA based resin may be PVA based resin obtained by saponifying polyvinyl acetate resin. In addition to polyvinyl acetate that is homopolymer of vinyl acetate, vinyl acetate and a copolymer with other monomers that can be copolymerized with vinyl acetate may be used as the polyvinyl acetate-based resin. As the other monomers, unsaturated carboxylic acid based monomers, unsaturated sulfonic acid based monomers, olefin based monomers, vinyl ether based monomers, acrylamide based monomers having ammonium groups, and the like may be used. Furthermore, the PVA based resin includes a denatured resin and, for example, may be polyvinyl formal or polyvinyl acetal denatured into aldehyde.

According to the embodiment, the coated polarizer may be formed of a composition for liquid crystal coating. At this point, the composition for liquid crystal coating may contain reactive liquid crystal compound, and dichroic dye.

The reactive liquid crystal compound may mean a compound, for example, including a mesogen frame, etc., and also including one or more polymerizable functional groups. The reactive liquid crystal compound may be variously known by the name reactive mesogen (RM). The reactive liquid crystal compound may constitute a cured film with a polymer network formed while being polymerized by light or heat and maintaining a liquid crystal arrangement.

The reactive liquid crystal compound may be a monofunctional liquid crystal compound or a multi-functional liquid crystal compound. The mono-functional liquid crystal compound is a compound having one polymerizable functional group, and the multi-functional liquid crystal compound may mean a compound having two or more polymerizable functional groups.

The dichroic dye is a substance contained in the composition for liquid crystal coating to provide the polarization characteristic, and has a property in which absorbance in a direction of long axis of molecule and absorbance in a direction of short axis are different. The dichroic dye may be a dichroic dyes currently developed or to be developed, and may include one or more types selected from a group consisting of azo dyes, anthraquinone dyes, perylene dyes, merocyanine dyes, azomethine dyes, phthaloperylene dyes, indigo dyes, dioxazine dyes, polythiophene dyes, and phenoxazine dyes.

The composition for liquid crystal coating may include a solvent capable of dissolving the reactive liquid crystal compound and the dichroic dye. For example, propylene glycol monomethyl ether acetate (PGMEA), methyl ethyl ketone (MEK), xylene, chloroform, and the like may be used. Furthermore, the composition for liquid crystal coating may include levelling agents, polymerization initiators, etc. within a range that does not impair the polarization characteristic of a coating film.

The protective layer 120 is provided to preserve the polarization characteristic of the polarizer 110 from a post-processing and external environment, and may be implemented into a form such as a protective film, etc.

Figure 4A:
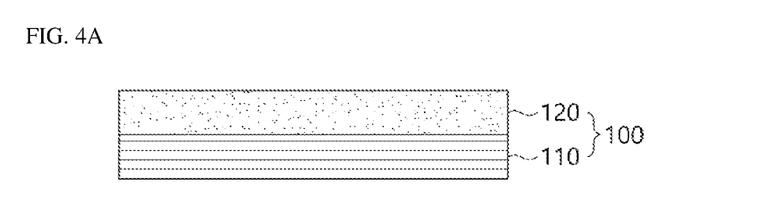
FIGS. 4A to 4E are views showing the stack structures of the polarizing plate according to one or multiple embodiments of the present disclosure.
Figure 4B:
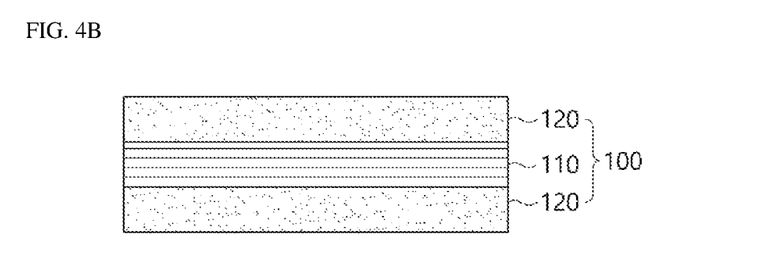

As shown in FIGS. 4A and 4B, the protective layer 120 may be formed by directly contacting with one surface or both surfaces of the polarizer 110, but is not limited thereto. For example, the protective layer may be used in a double-layer structure in which one or more protective layers are successively stacked, and may be formed by directly contacting with one surface or both surfaces of another functional layer.

According to one or multiple embodiments, the protective layer 120 may include one or more types selected from a group consisting of polyethylene terephthalate (PET), polyethylene isophthalate (PEI), polyethylene naphthalate (PEN), polybutylene terephthalate (PBT), diacetyl cellulose, triacetyl cellulose (TAC), polycarbonate (PC), polyethylene (PE), polypropylene (PP), polymethyl acrylate (PMA), polymethyl methacrylate (PMMA), polyethyl acrylate (PEA), polyethyl methacrylate (PEMA), and cyclic olefin polymer (COP).

The retardation matching layer 130 may be provided to complement optical characteristic of the optical stack, and may be implemented into a form of a retardation film, etc., and a retardation film, etc. currently developed or to be developed may be used therefor. For example, a quarter-wave plate (¼ wave plate), a half-wave plate (½ wave plate), etc. may be used to delay the phase of light, and may be used alone or in combination.

Figure 4C:
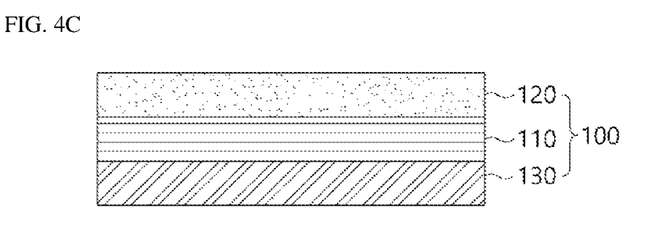
Figure 4D:
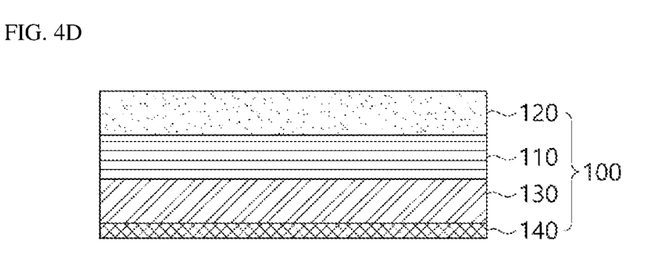
Figure 4E:
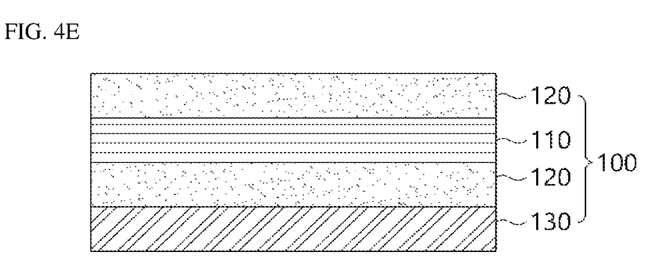

As shown in FIGS. 4C and 4D, the retardation matching layer 130 may be formed by directly contacting with one surface of the polarizer 110, and is not limited thereto. For example, as shown in FIG. 4E, the retardation matching layer 130 is formed on one surface of the protective layer 120, and the polarizer 110, the protective layer 120, and the retardation matching layer 130 may be successively stacked.

The retardation matching layer 130 may be a polymer stretched film, which is formed by stretching a polymer film that can provide optical anisotropy by stretching in an appropriate manner, or a liquid crystal polymerized film.

According to the embodiment, the polymer stretched film may use a polymer layer including polyolefin such as polyethylene (PE), polypropylene (PP), etc., cyclo olefin polymer (COP) such as polynorbornene, etc., polyester such as polyvinyl chloride (PVC), polyacrylonitrile (PAN), polysulfone (PSU), acryl resin, polycarbonate (PC), polyethylene terephthalate (PET), etc.; and/or cellulose ester polymer such as polyacrylate, polyvinyl alcohol (PVA), triacetyl cellulose (TAC), etc., or a copolymer of two or more monomers among monomers that can form the polymers.

An obtaining method of the polymer stretched film is not particularly limited and, for example, the polymer stretched film may be obtained by forming the polymer material into a film form and then stretching the material. The molding method for the film shape is not particularly limited, and the polymer stretched film may be formed in the known methods such as injection molding, sheet molding, blow molding, injection blow molding, inflation molding, extrusion molding, foaming molding, cast molding, etc., and may be formed in a secondary processing molding method such as pressure molding, vacuum molding, etc. Among them, the extrusion molding and cast molding may be preferably used. At this point, for example, an unstretched film may be extruded by using an extruder to which a T-die, a circular die, etc., are mounted. When a molded product is obtained in the extrusion molding, a material made by melt-kneading various resin components, additives, etc., in advance, may be used and the molded product may be formed by melt-kneading during extrusion molding. Furthermore, various resin components are dissolved by using a common solvent, for example, a solvent such as chloroform, 2 methylene chloride, etc., and then are solidified in a cast dry manner, and accordingly, the non-stretched film may be cast-molded.

The polymer stretched film may be provided by performing uniaxial stretching with respect to the molded film in a mechanical direction (MD, longitudinal or length direction), and by performing uniaxial stretching in a direction (TD, transverse direction or width direction) perpendicular to the MD, and furthermore, the molded film is stretched in a sequential biaxial stretching method of roll stretching and tenter stretching, a simultaneous biaxial stretching method of tenter stretching, a biaxial stretching method of tubular stretching, etc., so that a biaxial stretched film may be manufactured.

The liquid crystal polymerized film may include a reactive liquid crystal compound in a polymerized state. The description of the reactive liquid crystal compound of the above-mentioned coated polarizer may be equally applied to the reactive liquid crystal compound.

According to one or multiple embodiments, the retardation matching layer 130 may have the thickness ranging from 10 μm to 100 μm in the case of the polymer stretched film, and may have the thickness ranging from 0.1 μm to 5 μm in the case of the liquid crystal polymerized film.

The refractive index-matching layer 140 is provided to compensate for the difference in the refractive index of the optical stack by the electrode layer 200, and may serve to improve the visible characteristic by reducing the difference in the refractive index. Furthermore, the refractive index-matching layer 140 may be provided to correct a color based on the electrode layer 200. Meanwhile, when the electrode layer has a pattern, the refractive index-matching layer 140 may correct the difference in the transmittance between a pattern region in which the pattern is formed and a non-pattern region in which the pattern is not formed.

Specifically, the electrode layer 200 is stacked close to other members having a refractive index different therefrom (for example, the polarizer 110, etc.), and due to the difference in the refractive index between the electrode layer 200 and another member close thereto, the difference in optical transmittance may be caused. Specifically, when the pattern is formed on the electrode layer, there may be a problem in that the pattern region and the non-pattern region are visually distinguished from each other. Therefore, the refractive index regulating layer 140 is included to compensate for a refractive index, thereby reducing the difference in the optical transmittance of the optical stack. Specifically, when the pattern is formed on the electrode layer, the problem in that the pattern region and the non-pattern region are divided to be visually distinguished should be prevented.

According to the embodiment, the refractive index of the refractive index-matching layer 140 may be appropriately selected according to a material of another adjacent member, preferably, may range from 1.4 to 2.6, more preferably from 1.4 to 2.4. In this case, it is possible to prevent optical loss due to a sharp difference in the refractive index between another member such as the polarizer 110 and the electrode layer 200.

The refractive index-matching layer 140 is not particularly limited as long as it can prevent the sharp difference in the refractive index between other members such as the polarizer 110 and the electrode layer 200, and may use a compound used in the formation of an index-matching layer currently developed or to be developed. For example, the refractive index-matching layer 140 may be formed from a refractive index-matching layer formation composition containing a polymerizable isocyanate compound.

According to the embodiment, the polarizing plate 100 may include other functional layers to assist or strengthen the characteristics of the polarizer in addition to the above-mentioned functional layers and, for example, may include an overcoat layer, etc. to further improve the mechanical durability.

According to one or multiple embodiments, the polarizing plate 100 may have a thickness ranging from 30 to 200 μm, preferably a thickness ranging from 30 to 170 μm, more preferably a thickness ranging from 50 to 150 μm. In this case, while the polarizing plate 100 maintains the optical characteristic, the optical stack having a thin thickness can be manufactured.

The electrode layer 200 is provided to drive the liquid crystal layer 300, and may be formed by directly contacting with the polarizing plate 100. For example, as shown in FIGS. 1 and 2, the first electrode layer 200-1 and the second electrode layer 200-2 may be respectively formed by directly contacting with the first polarizing plate 100-1 and the second polarizing plate 100-2.

The optical stack used for manufacturing the conventional smart window is manufactured by forming a conductive layer for controlling the liquid crystal on a first surface of a substrate and bonding a second surface of the substrate with the polarizing plate. However, according to the present disclosure, the variable transmittance optical stack does not include a separate or additional substrate for forming the electrode layer, and is manufactured by directly forming the electrode layer on one surface of the polarizing plate, thereby reducing the thickness of the stack and improving the transmittance in a light transmissive mode and the curvature characteristic.

According to the embodiment, the electrode layer 200 may be formed by being directly deposited on one surface of the polarizing plate 100. At this point, to improve adhesion between the electrode layer 200 and the polarizing plate 100, after performing pre-processing such as corona processing or plasma processing on one surface of the polarizing plate 100, the electrode layer 200 may be formed by directly contacting with the surface of the polarizing plate 100 where the pre-processing is performed. The pre-processing is not limited to the corona processing or plasma processing, and within a range without affecting the objective of the present disclosure, pre-processing currently developed or to be developed may be used.

According to another embodiment, to improve adhesion between the electrode layer 200 and the polarizing plate 100, the electrode layer 200 may be formed by directly contacting with the polarizing plate 100, with highly adhesive layer (not shown) provided on one surface of the polarizing plate 100.

The electrode layer 200 may have the transmittance of 50% or more with respect to visible light and, preferably may include the conductive polymers. For example, the electrode layer 200 may be manufactured by a compositions for formation of an electrode layer including one or more types selected from a group consisting of conductive polymers; and organic binders, organic solvents, silane coupling agents, and surfactants, and may include residual quantity of water when necessary of the user. In this case, even when deformation due to external stress is applied to an electrode layer 200, it is possible to prevent a crack from occurring to the transparent conductive layer and to prevent sheet resistance from excessively increasing.

The conductive polymers may use conductive polymer materials currently developed or to be developed and, for example, may include one or more types selected from a group consisting of polythiophene, poly(3,4-ethylenedioxythiophene), polyaniline, polyacetylene, polydiacetylene, polyphenylene, polyphenylenevinylene, polyphenylene sulfide, polythienylenevinylene, polythiophenevinylene, polyfluorene, polypyrrole, poly(3,4-ethylenedioxythiophene):polystyrenesulfonate, poly(3,4-ethylenedioxythiophene):camphorsulfonic acid, poly(3,4-ethylenedioxythiophene):toluenesulfonic acid, poly(3,4-ethylenedioxythiophene):dodecylbenzenesulfonic acid, polyaniline:polystyrenesulfonate, polyaniline:camphorsulfonic acid, polypyrrole:polystyrenesulfonate, polypyrrole:camphorsulfonic acid, polypyrrole:toluenesulfonic acid, polypyrrole:dodecylbenzenesulfonic acid, polythiophene:polystyrenesulfonate, polythiophene:camphorsulfonic acid, polythiophene:toluenesulfonic acid, and polythiophene:dodecylbenzenesulfonic acid, and preferably may be poly(3,4-ethylenedioxythiophene) or poly(3,4-ethylenedioxythiophene):polystyrenesulfonate.

The content of the conductive polymers is not particularly limited and, but the conductive polymers may be included at the content of 10% by weight to 65% by weight and, preferably of 10% by weight to 50% by weight and, more preferably of 11% by weight to 30% by weight, with respect to the entire weight of the compositions for formation of an electrode layer.

The organic binders may include one or more types selected from a group consisting of melamine resin, polyester resin, polyurethane resin, and polyacryl resin. Furthermore, the organic binders may be waterborne resin.

According to the embodiment, a weight-average molecular weight of the organic binders may range from 5,000 g/mol to 30,000 g/mol, and particularly, from 10,000 g/mol to 20,000 g/mol.

The content of the organic binders is not particularly limited, but the organic binders may be included at the content of 1% by weight to 20% by weight, preferably of 1% by weight to 10% by weight, more preferably of 1% by weight to 5% by weight, with respect to the entire weight of the compositions for formation of an electrode layer.

The organic solvents may include alcohol based organic solvent, ether based organic solvent, and/or amide based organic solvent.

The alcohol based organic solvent serves to lower a surface tension of the compositions for formation of an electrode layer to improve coating performance. According to the embodiment, the alcohol based organic solvent may be alcohol of 1 to 4 carbon number and, for example, may use methanol, ethanol, propanol, isopropanol, n-butyl alcohol, etc.

The ether based organic solvent may use an ether based organic solvent currently developed or to be developed and, for example, may use propyleneglycolmonopropylether, propyleneglycolmonomethylether, ethyleneglycolmonomethylether, ethyleneglycolmonoethylether, ethyleneglycolmonopropylether, ethyleneglycolmonobutylether, diethyleneglycolmonomethylether, diethyleneglycolmonoethylether, diethyleneglycolmonopropylether, diethyleneglycolmonobutylether, diethyleneglycol-2-ethylhexyl ether, etc.

The amide based organic solvent serves to improve conductivity of the manufactured electrode layer. According to the embodiment, the amide based organic solvent may use acetamide, N-methylacetamide, N-dimethylacetamide, N-methylpyrrolidone, etc.

The contents of organic solvents is not particularly limited, but the organic solvents may be included at the content of 10% by weight to 80% by weight, preferably of 40% by weight to 65% by weight, more preferably of 45% by weight to 60% by weight, with respect to the entire weight of the compositions for formation of an electrode layer.

The silane coupling agent serves to improve adhesion of the compositions for formation of an electrode layer to facilitate stacking of the electrode layer 200 on the polarizing plate 100. According to the embodiment, the silane coupling agent may include one or more types selected from a group consisting of trimethoxy silane, triethoxy silane, tetramethoxy silane, and tetraethoxy silane. For example, the triethoxy silane may be 2-(3,4-epoxycyclohexyl)ethyltriethoxy silane, (3-aminopropyl)triethoxy silane), (pentafluorophenyl)triethoxy silane, (3-glycidyloxypropyl)triethoxy silane, or (4-chlorophenyl)triethoxy silane, the trimethoxy silane may be (3-glycidyloxypropyl) trimethoxy silane, (3-chloropropyl) trimethoxy silane, (3-mercaptopropyl) trimethoxy silane, (3-glycidyloxypropyl) trimethoxy silane, (3-aminopropyl) trimethoxy silane, [3-(2-aminoethylamino) propyl]trimethoxy silane, (N,N-dimethylaminopropyl) trimethoxy silane, (3-bromopropyl) trimethoxy silane, or (3-iodopropyl) trimethoxy silane.

In an aspect of improvement of adhesion between the polarizing plate 100 and the electrode layer 200, the silane coupling agent may be included at the content of 0.05% by weight to 0.3% by weight with respect to the entire weight of the compositions for formation of an electrode layer.

The surfactant may be silicone surfactant or acetylene surfactant, and the silicone surfactant may be modified silicone surfactant.

For example, commercially available products of the silicone surfactant may include BYK-378 at BYK, etc., and commercially available products of the acetylene surfactant may include Dynol 604 of Air Products Company, etc.

The content of the surfactant is not particularly limited, but the surfactant may be included at the content of 0.02% by weight to 0.4% by weight, preferably of 0.1% by weight to 0.4% by weight, with respect to the entire weight of the compositions for formation of an electrode layer.

The electrode layer 200 may be configured to have a physical alignment structure at least a part of regions thereof to provide orientation to a liquid crystal compound 310 provided in the liquid crystal layer 300.

The optical stack conventionally including the liquid crystal layer is manufactured by including a separate alignment film to provide orientation to the liquid crystal compound provided in the liquid crystal layer. However, the optical stack according to the present disclosure may include a physical alignment structure at the electrode layer itself including the conductive polymers, without a separate alignment film. Accordingly, the technical feature of the present disclosure is to solve a problem occurring when including a conventional alignment film, for example, thickness unevenness, deteriorated adhesion, or the like according to a drying condition of an alignment film.

A forming method of the physical alignment structure may include methods commonly used in the art, for example, by a rubbing manner using a rubbing roller on which a rubbing cloth is wound.

According to the embodiment, the electrode layer 200 may have a thickness ranging from 100 nm to 3,000 nm, preferably a thickness ranging from 150 nm to 2,000 nm, more preferably a thickness ranging from 200 nm to 1500 nm. The thickness of the electrode layer may mean a thickness of the finally formed electrode layer after the physical alignment structure is formed by the rubbing manner. When the thickness of the electrode layer meets the above-described range, manufacturing of the electrode film that can ensure a predetermined transmittance, has a less characteristic change due to external stress, and has a thin thickness.

According to the embodiment of the present disclosure, the electrode layer 200 preferably has a sheet resistance of 200Ω/□ or less. In this case, there is an advantage in that stable operation of products can be performed only with the electrode layer 200 itself having the physical alignment structure without an alignment film.

According to the embodiment, the variable transmittance optical stack may include a transparent conductive layer in addition to the electrode layer.

Referring to FIG. 2, the transparent conductive layer 210 may be arranged between the polarizing plate 100 and the electrode layer 200. As shown in FIG. 2, the transparent conductive layer 210 may be implemented into a first transparent conductive layer 210-1 arranged between the first polarizing plate 100-1 and the first electrode layer 200-1, and a second transparent conductive layer 210-2 arranged between the second polarizing plate 100-2 and the second electrode layer 200-2. However, the present disclosure is not limited to the embodiment shown in FIG. 2, and the transparent conductive layer may include one transparent conductive layer from among the first transparent conductive layer or the second transparent conductive layer.

The transparent conductive layer 210 preferably has the transmittance of 50% or more with respect to visible light, and for example may include one or more types selected from a group consisting of transparent conductive oxide, metal, carbonaceous materials, conductive ink, and nanowires. However, transparent conductive layer is not limited thereto, and may use transparent conductive layer materials currently developed or to be developed.

According to one or multiple embodiments, the transparent conductive oxide may include one or more kinds selected from a group consisting of indium tin oxide (ITO), indium zinc oxide (IZO), indium zinc tin oxide (IZTO), aluminum zinc oxide (AZO), gallium zinc oxide (GZO), florin tin oxide (FTO), zinc oxide (ZnO), etc. Furthermore, the metal may include one or more types selected from a group consisting of aurum (Au), argentum (Ag), cuprum (Cu), aluminum (Al), platinum (Pt), palladium (Pd), chromium (Cr), titanium (Ti), tungsten (W), niobium (Nb), tantalum (Ta), vanadium (V), iron (Fe), manganese (Mn), cobalt (Co), nickel (Ni), zinc (Zn), alloy containing at least one of them, etc., and for example, may include argentum-palladium-cuprum (APC) alloy or cuprum-calcium (CuCa) alloy. The carbonaceous materials may include one or more types selected from a group consisting of carbon nanotube (CNT), graphene, etc. The conductive ink may be a mixture of metal powder and curable polymer binder, and the nanowires may be for example silver nanowires (AgNW).

Furthermore, the transparent conductive layer 210 may be formed into a structure of two or more layers while combining the above materials. For example, in order to reduce the reflectance of incident light and increase the transmittance, the transparent conductive layer 210 may be formed into a structure of two layers including a metal layer and a transparent conductive oxide layer.

According to the embodiment, the transparent conductive layer 210 may have a thickness ranging from 100 nm to 1,000 nm, preferably have a thickness ranging from 130 nm to 800 nm, and more preferably have a thickness ranging from 150 nm to 600 nm. When the thickness of the transparent conductive layer meets the above range, there is an advantage of securing an appropriate sheet resistance for operating the products and improving the exterior quality of the products without deteriorating the transmittance of the products.

When the optical stack includes the transparent conductive layer 210 according to the embodiment of the present disclosure, the transparent conductive layer 210 may be formed by directly contacting with the polarizing plate 100 and, for example, the first transparent conductive layer 210-1 may be formed by directly contacting with the first polarizing plate 100-1, and/or the second transparent conductive layer 210-2 may be formed by directly contacting with the second polarizing plate 100-2. In this case, the description of the above-mentioned electrode layer that is formed by directly contacting with the polarizing plate may be equally applied thereto.

When the variable transmittance optical stack includes the above-mentioned transparent conductive layer 210 apart from the electrode layer 200, it is preferable in an aspect of the advantage of improving the external quality of the products.

The liquid crystal layer 300 may adjust the transmittance of light incident in one or multiple directions in response to electric fields to change an operating mode of the optical stack.

The liquid crystal layer 300 may include the liquid crystal compound 310 and a spacer 320 and, for example, may be provided between the first electrode layer 200-1 and the second electrode layer 200-2 in an optical control region, and may be located in a space provided by a sealant 330 provided along an external circumferential surface of the liquid crystal layer 300 and sealing the liquid crystal layer 300.

The liquid crystal compound 310 is not particularly limited as long as it is driven according to electrode fields and can control the transmittance of light, and may use liquid crystal compounds currently developed or to be developed. For example, the description about the reactive liquid crystal compound of the above-mentioned polarizer may be equally applied thereto.

A liquid crystal movement method of the liquid crystal compound is not particularly limited and, for example, a twisted nematic (TN) mode, a super twisted nematic (STN) mode, a vertical alignment (VA) mode, an electrically controlled birefringence (ECB) mode, etc. may be used.

The spacer 320 may include a ball spacer, and the ball spacer may include one or more ball spacers, and preferably has a diameter ranging from 1 to 10 μm. Furthermore, when viewed in a planar direction, an area where the ball spacer is occupied in the liquid crystal layer 300 preferably ranges from 0.01 to 10% of the area of the liquid crystal layer 300 in an aspect of improvement of user's visibility and transmittance in a light transmissive mode.

The sealant 330 may include curable resins as base resins. As the base resins, UV curable resins or heat curable resins that are known to be usable for sealants in the art may be used. The ultraviolet curable resins may be polymers of UV curable monomers. The heat curable resins may be polymers of heat curable monomers.

As the base resins of the sealant, for example, acrylate based resins, epoxy based resins, urethane based resins, phenol based resins, or compounds of these resins may be used. According to an embodiment, the base resins may be acrylate based resins, and the acrylate based resins may be polymers of acrylic monomers. For example, the acrylic monomers may be multifunctional acrylate. According to another embodiment, the sealant may include monomer substances in addition to the base resins. For example, the monomer substances may be monofunctional acrylate. In the specification, the monofunctional acrylate may mean compounds having one acryl group, and the multifunctional acrylate may mean compounds having two or more acryl groups. The curable resins may be cured by UV irradiation and/or heating. The UV irradiation condition or heat condition may be performed appropriately within the scope that does not damage the objective of the present disclosure. In case of need, the sealant may include initiators, for example, optical initiators or heat initiators.

The sealant 330 may be provided in a method commonly used in the art and, for example, may be formed drawing a sealant at an outer portion of the liquid crystal layer 300 (i.e., inactivate region) with a dispenser having a nozzle.

The variable transmittance optical stack of the present disclosure may include other members within a range that does not damage the objective of the present disclosure and, for example, may include the pressure sensitive adhesive layer 400 (referring to FIG. 3), and may include an adhesive layer, an UV absorption layer, an hard coating layer, etc.

The pressure sensitive adhesive layer 400 may be formed using a pressure sensitive adhesive, and preferably has appropriate pressure-sensitive adhesion to prevent occurrence of peeling, bubbles, etc. when handling the optical stack, and preferably have transparency and thermal stability.

The pressure-sensitive adhesive may use a pressure-sensitive adhesive currently developed or to be developed. According to one or multiple embodiments, as the pressure-sensitive adhesive, acrylic-based pressure-sensitive adhesive, rubber-based pressure-sensitive adhesive, silicon-based pressure-sensitive adhesive, urethane-based pressure-sensitive adhesive, polyvinyl alcohol-based pressure-sensitive adhesive, polyvinyl pyrrolidone-based pressure sensitive adhesive, polyacrylamide-based pressure sensitive adhesive, cellulose-based pressure sensitive adhesive, vinylalky ether-based pressure sensitive adhesive and the like. The pressure-sensitive adhesive is not particularly limited as long as it has pressure-sensitive adhesion and viscoelasticity. For ease of acquisition, preferably, the pressure-sensitive adhesive may include acrylic-based pressure-sensitive adhesive, for example, may be (meth) acrylate copolymers, crosslinkers, solvents, and the like.

The crosslinkers may be crosslinkers currently developed or to be developed and, for example, polyisocyanate compounds, epoxy resins, melamine resins, urea resins, dialdehydes, methylol polymers, etc., and may preferably contain polyisocyanate compounds.

The solvents may include common solvents used in the field of resin compositions. For example, the solvents may use solvents such as: alcohol-based compounds such as methanol, ethanol, isopropanol, butanol, propylene glycol methoxy alcohol, and the like; ketone-based compounds such as methyl ethyl ketone, methyl butyl ketone, methyl isobutyl ketone, diethyl ketone, dipropyl ketone, and the like; acetate-based compounds such as methyl acetate, ethyl acetate, butyl acetate, propylene glycol methoxy acetate, and the like; cellosolve-based compounds such as methyl cellosolve, ethyl cellosolve, propyl cellosolve, etc.; hydrocarbon-based compounds such as hexane, heptane, benzene, toluene, xylene, and the like. The solvents may be used alone or combination of two or more types.

The adhesive layer may be formed using an adhesive, and preferably has appropriate adhesion to prevent occurrence of peeling, bubbles, etc. when handling the optical stack, and preferably have transparency and thermal stability.

The adhesive may be an adhesive currently developed or to be developed, for example, may use photocurable adhesive.

The photocurable adhesive provides strong adhesion by being crosslinked and cured by receiving active energy rays such as ultraviolet rays (UV), electron beam (EB), etc., and may be composed of reactive oligomers, reactive monomers, photopolymerization initiators, and the like.

The reactive oligomers are important components that determine the properties of adhesive, and form polymer binding by photopolymerization to form a cured film. The available oligomers may be polyester-based resin, polyether-based resin, polyurethane-based resin, epoxy-based resin, polyacryl-based resin, silicon-based resin, and the like.

The reactive monomers may serve as crosslinker, diluent of the reactive oligomers described above, and affect adhesion characteristics. For example, the available reactive monomers may be monofunctional monomers, multifunctional monomers, epoxy-based monomers, vinyl ethers, cyclic ethers, and the like.

The photopolymerization initiators may absorb light energy to generate radicals or cations to initiate photopolymerization, and a proper kind of initiator may be selected and used depending on photopolymerization resin.

The thickness of the pressure sensitive adhesive layer 400 or the adhesive layer may be appropriately determined depending on a type of resins serving as the pressure sensitive adhesive/adhesive, the strength of the pressure sensitive adhesion/adhesion, the environment where the pressure sensitive adhesive/adhesive is used, and the like. According to the embodiment, in order to secure sufficient pressure sensitive adhesion/adhesion and reduce the thickness of the optical stack, the pressure sensitive adhesive/adhesive layer may have the thickness ranging from 0.01 to 50 μm, preferably have the thickness ranging from 0.05 to 20 μm, and more preferably have the thickness ranging from 0.1 to 10 μm.

The UV absorption layer is not particularly limited as long as it is to prevent deterioration of the optical stack due to UV rays. For example, the UV absorption layer may use salicylic acid-based UV absorber (phenyl salicylate, p-tert-butylsalicylate, etc.), benzophenone-based UV absorber (2,4-dihydroxybenzophenone, 2,2'-dihydroxy-4,4'-dimethoxybenzophenone, etc.), benzotriazole-based UV absorber (2-(2'-hydroxy-5'-methylphenyl)benzotriazole, 2-(2'-hydroxy-3', 5'-di-tert-butylphenyl)benzotriazole, 2-(2'-hydroxy-3'-tert-butyl-5'-methylphenyl)benzotriazole, 2-(2'-hydroxy-3',5'-di-tert-butylphenyl)-5-chlorobenzotriazole, 2-(2'-hydroxy-3'-(3",4",5",6"-tetrahydrophthalimide methyl)-5'-methylphenyl)benzotriazole, 2,2-methylenebis(4-(1,1,3,3-tetramethylbutyl)-6-(2H-benzotriazole-2-yl) phenol), 2-(2'-hydroxy-3'-tert-butyl-5'-methylphenyl)-5-chlorobenzotriazole, 2-(2'-hydroxy-3'-tert-butyl-5'-(2-octyloxicarbonylethyl)-phenyl)-5-2-(2'-hydroxy-3'-(1-methyl-1-phenylethyl)-5'-(1,1,3,3-chlorobenzotriazole, tetramethylbutyl)-phenyl)benzotriazole, 2-(2H-benzotriazole-2-yl)-6-(linear and side chain dodecyl)-4-methylphenol, octyl-3-[3-tert-butyl-4-hydroxy-5-(chloro-2H-benzotriazole-2-yl)phenyl]propionate and 2-ethylhexyl-3-[3-tert-butyl-4-hydroxy-5-(5-chloro-2H-benzotriazole-2-yl)phenyl]propionate compounds, etc.), cyanoacrylate-based UV absorber (2'-ethylhexyl-2-cyano-3,3-diphenylacrylate, ethyl-2-cyano-3-(3',4'-methylene dioxyphenyl)-acrylate, etc.), triazine-based UV absorber, etc. The benzotriazole-based UV absorber or the triazine-based UV absorber that have high transparency and the excellent effect of preventing deterioration of the polarizing plate or the variable transmittance layer may be preferably used as the UV absorption layer, and the benzotriazole-based UV absorber having more appropriate spectral absorption spectroscopy absorption spectrum may be preferable. The benzotriazole-based UV absorber may be changed into "-Bis" and, for example, may be 6,6'-methylene bis(2-(2H-benzo[d][1,2,3]triazole-2-yl)-4-(2,4,4-trimethylpentane-2-yl) phenol), 6,6'-methylene bis (2-(2H-benzo[d][1,2,3]triazole-2-yl)-4-(2-hydroxyethyl) phenol), etc.

The hard coating layer is not particularly limited as long as it is to protect members such as the polarizing plate, the variable transmittance layer, etc. from external physical and chemical shocks, and hard coating layers currently developed or to be developed may be used thereto.

According to the embodiment, the hard coating layer may be formed by applying compositions for forming a hard coating layer on another member and then hardening the layer with light or heat. The compositions for forming a hard coating layer are not particularly limited and, for example, may include photocurable compounds and a photoinitiator.

As the photocurable compounds and the photoinitiator, those commonly used in the art can be used without limitation, for example, the photocurable compounds may be photopolymerizable monomers, photopolymerizable oligomers, etc., for example, may be monofunctional and/or multifunctional (meth) acrylate, and the photoinitiator may be an oxime ester-based photoinitiator, etc.

In addition to the variable transmittance optical stack, the present disclosure includes a smart window including the same. Furthermore, the present disclosure may include transportation including the smart window, for example, a vehicle in which the smart window is applied to a front window, a rear window, a side window, a sunroof window, and/or an inner partition, and wearable devices and doors and windows for a building that include the smart window.

For example, the vehicle including the smart window of the present disclosure may be formed by bonding vehicle glass members onto both surfaces of the above-mentioned optical stack and, for example, may be formed by placing adhesive films and vehicle glass members on both surfaces of the optical stack and heating the stack at a temperature of 90° C. and in 1 bar vacuum state for 10 to 20 minutes by using a press machine, and the adhesive films may include an EVA film, a PVB film, etc.

Furthermore, smart window products for windows and doors may be manufactured such that building glass members may be bonded to one or both surfaces of the optical stack, or a building glass member is bonded on one surface of the optical stack in a laminate manner, and the smart window products for windows and doors with building glass members attached to both surfaces of the optical stack may be manufactured by applying the UV adhesive on both surfaces of the optical stack and bonding the building glass members to the surfaces and then UV hardening the surfaces.

Hereinbelow, the embodiment of the present disclosure will be described in detail. However, the present disclosure may not be limited to embodiments disclosed below and may be implemented in various shapes, and the embodiments merely ensure that the present disclosure of the present disclosure is complete and is provided to fully inform those skilled in the art of the scope of the invention, and may be defined by the scope of the claims.

Examples and Reference Examples: Manufacturing of Optical Stack

Example 1

The polarizing plate was manufactured by stacking the TAC protective film on both surfaces of the PVA stretched polarizer having the thickness of 21 μm by using the UV adhesive, and then hardening the adhesive by UV exposure.

Thereafter, the electrode layer was formed by applying the conductive polymers solution (mixture obtained by mixing poly(3,4-ethylenedioxythiophene):polystyrene-sulfonate (PEDOT:PSS) (Clevios™, Heraeus Company) 0.6% by weight, ethanol 32.4% by weight, deionized water 40% by weight, and 2-methoxyethanol 27% by weight), on one surface of the polarizing plate, by using bar-coater, and then drying the surface at 80° C. for 2 minutes. Thereafter, the rubbing roller was rotated above the conductive polymers in the rubbing alignment method to provide physical alignment. At this point, the electrode layer after the rubbing process had the thickness of 100 nm.

Thereafter, the ball spacer was formed on an upper surface of the electrode layer by inputting a solution manufactured by mixing the ball spacer (SP series, SEKISUI Company), into a spacer scatterer (SDSS-KHU02, Shindo Company), and scattering the mixture solution under a condition of 110° C. on the upper surface of the electrode layer, and drying the surface for 20 minutes.

Thereafter, a sealant (UVF-006, 70,000 mPa·s, SEKISUI Company) was applied onto the electrode layer of the lower polarizing plate by using a sealant dispenser (SHOTmini 200Ωx, MUSASHI Company) while matching a product size. Thereafter, while a polarizing axis of the upper polarizing plate and a polarizing axis of the lower polarizing plate are arranged in parallel to each other at 0° or 90°, the liquid crystals were injected in an one drop filling (ODF) method to bond the upper polarizing plate and the lower polarizing plate. Thereafter, UV hardening (500 mJ/cm2) was performed along a sealant line to manufacture the optical stack of Example 1.

Example 2

Except for manufacturing the electrode layer with the thickness of 250 nm, the optical stack of Example 2 was manufactured equal to the optical stack of Example 1.

Example 3

Except for manufacturing the electrode layer with the thickness of 500 nm, the optical stack of Example 3 was manufactured equal to the optical stack of Example 1.

Example 4

Except for manufacturing the electrode layer with the thickness of 1,000 nm, the optical stack of Example 4 was manufactured equal to the optical stack of Example 1.

Example 5

Except for manufacturing the electrode layer with the thickness of 2,000 nm, the optical stack of Example 5 was manufactured equal to the optical stack of Example 1.

Example 6

Except for manufacturing the electrode layer with the thickness of 3,000 nm, the optical stack of Example 6 was manufactured equal to the optical stack of Example 1.

Reference Example 1

Except for manufacturing the electrode layer with the thickness of 90 nm, the optical stack of Reference example 1 was manufactured equal to the optical stack of Example 1.

Reference Example 2

Except for manufacturing the electrode layer with the thickness of 3,200 nm, the optical stack of Reference example 2 was manufactured equal to the optical stack of Example 1.

Experimental Examples: Evaluation of Sheet Resistance and Crack (1) Sheet Resistance Evaluation For the optical stacks of Examples and Reference examples, a sheet resistance of the electrode layer was measured using a sheet resistance measuring apparatus (MCP-T370), and then evaluation results were shown in Table 1.

<Evaluation Criteria>

∘: sheet resistance of electrode layer is equal to or less than 200Ω/□

X: sheet resistance of electrode layer exceeds 200Ω/□

(2) Crack Evaluation

For the optical stacks of Examples and Reference examples, a crack on a surface of the electrode layer were evaluated by using an optical microscope (OM), and then evaluation results were shown in Table 1.

<Evaluation Criteria>

∘: crack on electrode layer surface is not visible

X: crack on electrode layer surface is visible.

TABLE 1

| Classification | Example 1 | Example 2 | Example 3 | Example 4 | Example 5 | Example 6 | Reference example 1 | Reference example 2 |
|---|---|---|---|---|---|---|---|---|
| Electrode Thickness (nm) | 100 | 250 | 500 | 1,000 | 2,000 | 3,000 | 90 | 3,200 |
| Sheet Resistance | ○ | ○ | ○ | ○ | ○ | ○ | X | ○ |
| Crack | ○ | ○ | ○ | ○ | ○ | ○ | ○ | X |

Referring to the above table, it can be seen that the optical stack according to the present disclosure has excellent sheet resistance even when physical alignment is provided in the electrode layer itself without an alignment film and the surface of the electrode layer has no crack.

Meanwhile, in the optical stack of Reference example 1 with the thickness of the electrode layer less than 100 nm, it can be seen that sheet resistance thereof exceeds 200Ω/□ and the sheet resistance is relatively high in comparison with Examples, and it can be seen that the optical stack of Reference example 2 with the thickness of the electrode layer thicker than 3,000 nm has a crack on the surface of the electrode layer.

Therefore, efficient operating of the optical stack can be achieved by the optical stack of the present disclosure in which physical alignment is provided in the electrode layer itself without an alignment film. More preferably, it can be seen that the thickness of the electrode layer ranges from 100 nm to 3,000 nm.

What is claimed is:

1. A variable transmittance optical stack comprising:
   a first polarizing plate;
   a first electrode layer formed on one surface of the first polarizing plate;
   a second polarizing plate opposing the first polarizing plate;
   a second electrode layer formed on one surface of the second polarizing plate, and opposing the first electrode layer; and
   a liquid crystal layer provided between the first electrode layer and the second electrode layer,
   wherein the first electrode layer and the second electrode layer comprise conductive polymers, and
   the first electrode layer and the second electrode layer have physical alignment structures on at least a part of regions thereof by a rubbing manner.

2. The variable transmittance optical stack of claim 1, wherein the variable transmittance optical stack is provided without a separate alignment film.

3. The variable transmittance optical stack of claim 1, wherein the first electrode layer and the second electrode layer have a thickness ranging from 100 nm to 3,000 nm.

4. The variable transmittance optical stack of claim 1, wherein the first electrode layer and the second electrode layer have sheet resistance of 200Ω/□ or less.

5. The variable transmittance optical stack of claim 1, wherein the first electrode layer and the second electrode layer are made of compositions for formation of an electrode layer, and the compositions comprises: conductive polymers; and one or more types selected from a group consisting of organic binders, organic solvents, silane coupling agents, and surfactants.

6. The variable transmittance optical stack of claim 5, wherein the conductive polymers comprise one or more types selected from a group consisting of polythiophene, poly(3,4-ethylenedioxythiophene), polyaniline, polyacetylene, polydiacetylene, polyphenylene, polyphenylenevinylene, polyphenylenesulfide, polythienylenevinylene, polythiophenevinylene, polyfluorene, polypyrrole, poly(3,4-ethylenedioxythiophene):polystyrenesulfonate, poly(3,4-ethylenedioxythiophene):camphorsulfonic acid, poly(3,4-ethylenedioxythiophene):toluenesulfonic acid, poly(3,4-ethylenedioxythiophene):dodecylbenzenesulfonic acid, polyaniline:polystyrenesulfonate, polyaniline:camphorsulfonic acid, polypyrrole:polystyrenesulfonate, polypyrrole:camphorsulfonic acid, polypyrrole:toluenesulfonic acid, polypyrrole:dodecylbenzenesulfonic acid, polythiophene:polystyrenesulfonate, polythiophene:camphorsulfonic acid, polythiophene:toluenesulfonic acid, and polythiophene:dodecylbenzenesulfonic acid.

7. The variable transmittance optical stack of claim 1, wherein at least one electrode layer from among the first electrode layer and the second electrode layer is formed to come into direct contact with one first polarizing plate from among the first polarizing plate and the second polarizing plate.

8. The variable transmittance optical stack of claim 1, further comprising:
   at least one transparent conductive layer from among a first transparent conductive layer arranged between the first polarizing plate and the first electrode layer; and a second transparent conductive layer arranged between the second polarizing plate and the second electrode layer.

9. The variable transmittance optical stack of claim 8, wherein at least one transparent conductive layer from among the first transparent conductive layer and the second transparent conductive layer has a thickness ranging from 100 nm to 1,000 nm.

10. The variable transmittance optical stack of claim 8, wherein at least one transparent conductive layer from among the first transparent conductive layer and the second transparent conductive layer comprises one or more types selected from a group consisting of transparent conductive oxide, metal, carbonaceous materials, conductive ink, and nanowires.

11. The variable transmittance optical stack of claim 1, wherein at least one polarizing plate from among the first polarizing plate and the second polarizing plate comprises one or more types of functional layers selected from a group consisting of a protective layer, a retardation matching layer, and a refractive index-matching layer.

12. The variable transmittance optical stack of claim 1, wherein at least one polarizing plate from among the first polarizing plate and the second polarizing plate has a thickness ranging from 30 to 200 μm.

13. The variable transmittance optical stack of claim 1, wherein the liquid crystal layer comprises a ball spacer.

14. The variable transmittance optical stack of claim 13, wherein the ball spacer has a diameter ranging from 1 to 10 μm.

15. The variable transmittance optical stack of claim 13, wherein an occupancy area of the ball spacer in the liquid crystal layer ranges from 0.01% to 10% of an area of the liquid crystal layer.

16. The variable transmittance optical stack of claim 1, wherein the variable transmittance optical stack further comprises one or more types selected from a group consisting of an overcoat layer, a pressure sensitive adhesive/adhesive layer, an UV absorption layer, and a hard coating layer.

17. A manufacturing method for the variable transmittance optical stack of claim 1.

18. A smart window comprising the variable transmittance optical stack of claim 1.

* * * * *